United States Patent [19]

Brisson

[11] 4,214,616
[45] Jul. 29, 1980

[54] TREE DELIMBING APPARATUS

[75] Inventor: Maurice J. Brisson, Laval, Canada

[73] Assignee: Forano Limitee, Plessiville, Canada

[21] Appl. No.: 904,807

[22] Filed: May 11, 1978

[30] Foreign Application Priority Data

Feb. 16, 1978 [CA] Canada ................................. 297048

[51] Int. Cl.² .............................................. B27L 1/00
[52] U.S. Cl. ................................. 144/2 Z; 144/208 J;
241/194
[58] Field of Search ............... 144/2 Z, 3 D, 309 AC,
144/311, 208 R, 208 J, 250 R; 241/189 R, 193,
194

[56] References Cited

U.S. PATENT DOCUMENTS

| | | | |
|---|---|---|---|
| 1,241,925 | 10/1917 | Coleman | 144/250 R |
| 1,762,595 | 6/1930 | Smith | 144/208 J |
| 3,464,468 | 9/1969 | Thompson et al. | 144/34 R X |

FOREIGN PATENT DOCUMENTS 144423  3/1954  Sweden ................................. 144/208 J Primary Examiner—Robert Louis Spruill
Assistant Examiner—W. D. Bray
Attorney, Agent, or Firm—Cushman, Darby & Cushman

[57] ABSTRACT

A tree delimbing apparatus comprises a housing through which trees are conveyed and delimbed; the housing has an open bottom through which branches and leaves are discharged. A series of rollers are mounted inside the housing for conveying and delimbing the trees; the delimbing rollers are drums to which are attached a plurality of flexible flails extendible under centrifugal force, the flails detaching leaves and branches from the trees as they are conveyed through the housing. The particular construction of the housing enables the recuperation of all limb debris for other uses such as energy source, prevents pollution from spreading of such debris, and insures safety of all personnel in the vicinity of the machine.

16 Claims, 7 Drawing Figures

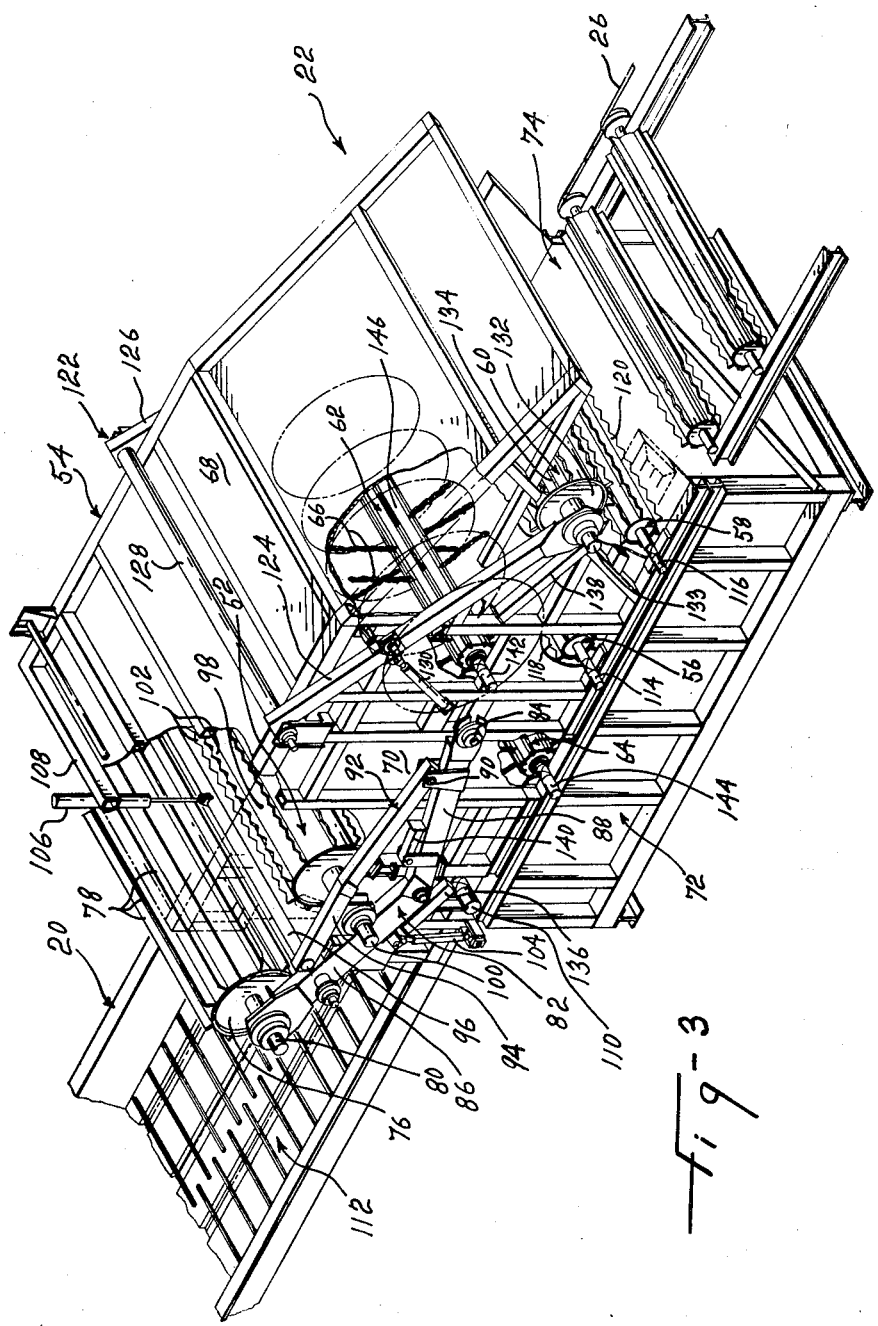

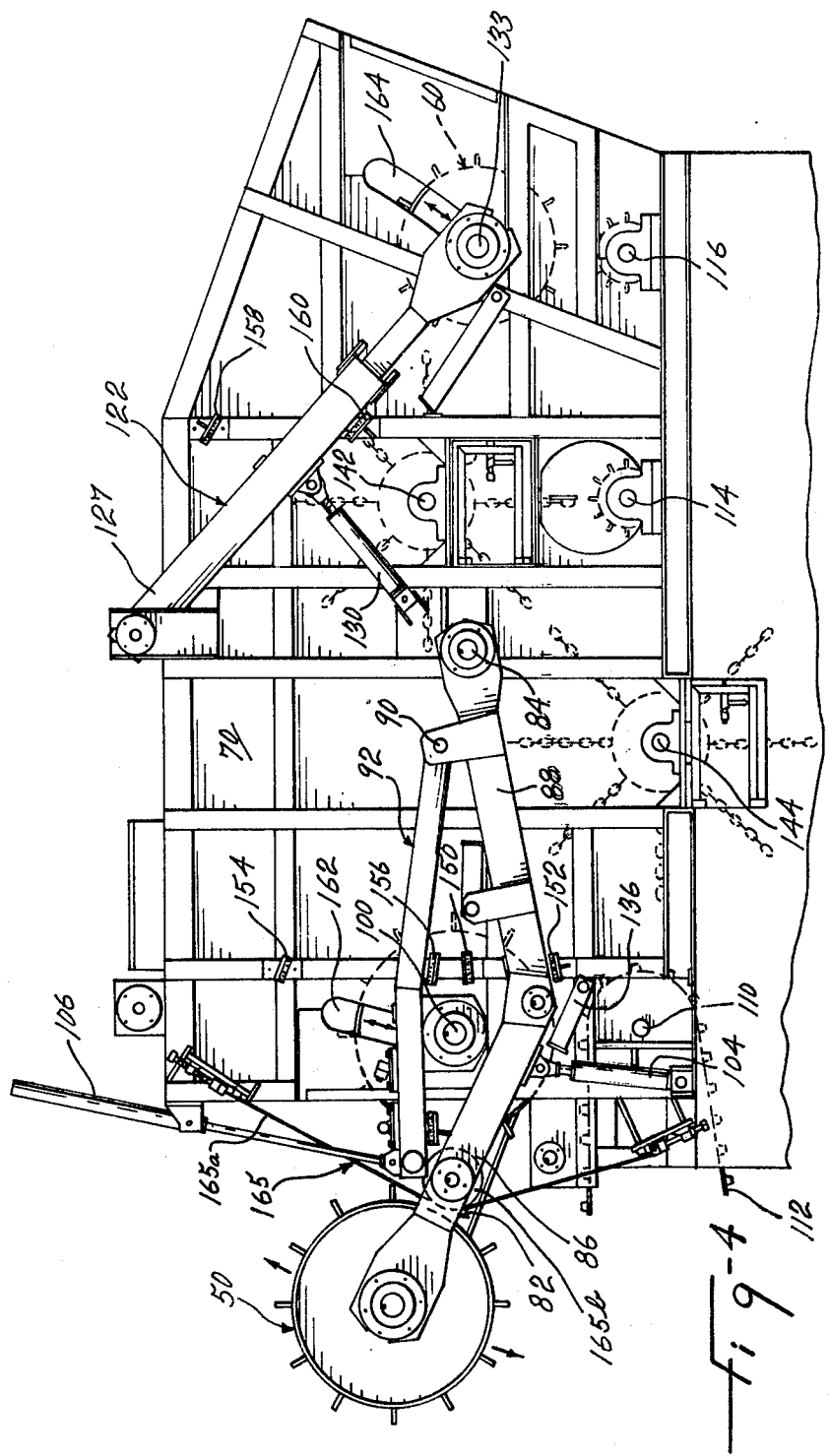

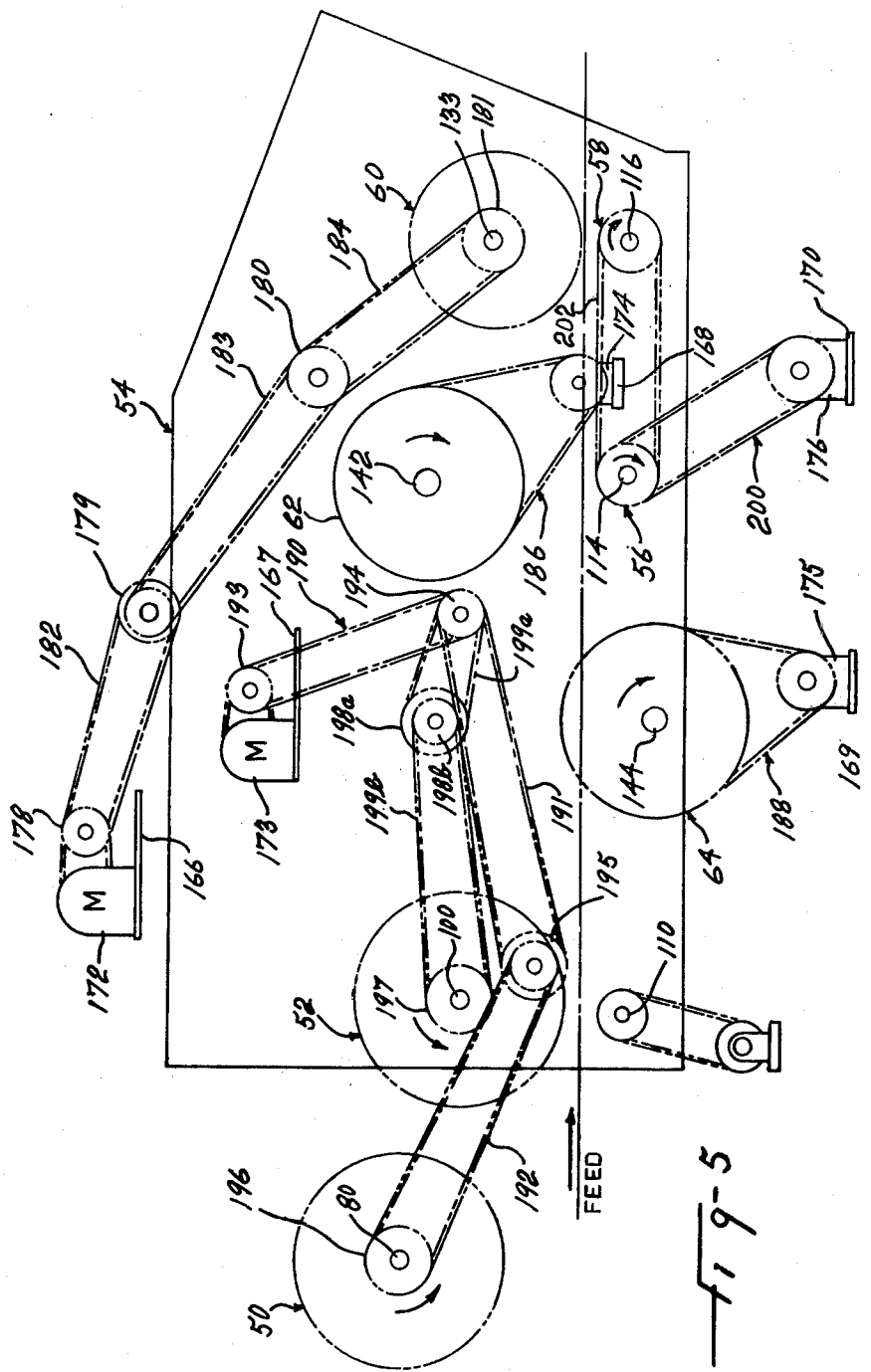

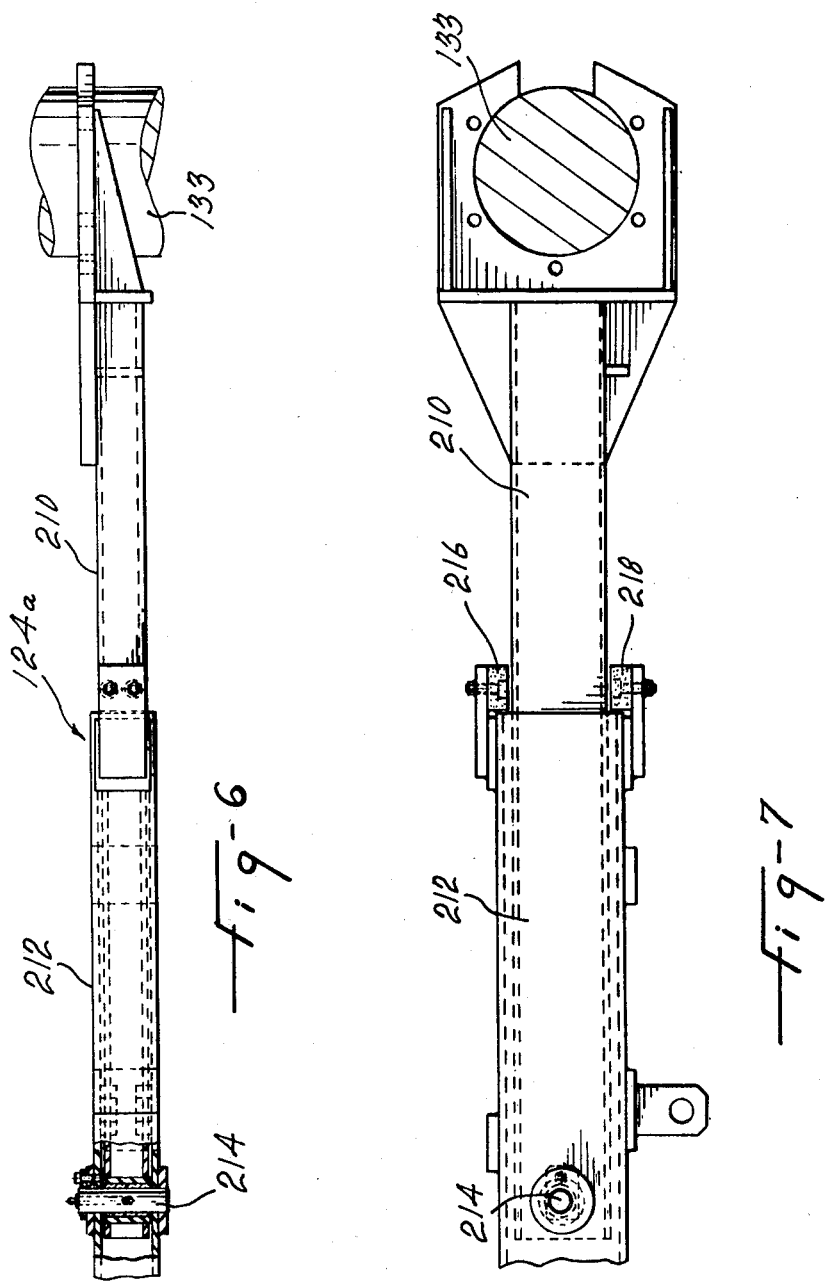

TREE DELIMBING APPARATUS

FIELD OF THE INVENTION

The present invention relates to a tree delimbing apparatus.

BACKGROUND OF THE INVENTION

At present, time and effort are being spent within the pulp and paper industry in studying ways and means of substantially reducing the high and still escalating cost of harvesting and preparing wood for delivery to the processing mill. Also, time and effort are spent in reducing the cost of producing energy. Therefore, all means capable of serving as a source of energy must be preserved. Every component of a tree may serve some purpose; it is therefore important that one hundred percent of a felled tree must be used. The limb debris of a cut tree can be used as a source of energy or, through a series of wood treating processes, can be converted into useful products.

Present tree delimbing methods are carried out directly at the cutting location and branches and leaves are left on the ground. One method of delimbing trees is described in Canadian Pat. No. 964,965 issued Mar. 25, 1975 to Michael Stadnick; this patent describes a truck carrying a rotating drum with flails which is driven over a pile of cut trees laying on the ground so that the rotating flails may engage and detach the branches and leaves. Since the tree delimber travels on felled timber, it is extremely difficult to obtain a complete delimbing of the trunk as the branches located between the trunk and the ground are not usually reached. Another type of tree delimber is described in Canadian Pat. No. 598,362 issued May 17, 1960 to David C. Horncastle. In this construction, trees are conveyed, one at a time, between two vertically disposed flail-carrying drums and the limb debris are expelled sideways on opposite side of the apparatus. During the operation of the apparatus of this patent, only one tree may be passed between the two adjacently disposed drums; hence, this construction is not recommended on cutting sites where a considerable number of cut trees must be quickly delimbed.

STATEMENT OF THE INVENTION

It is an object of the present invention to alleviate the above described disadvantages associated with prior apparatus by providing a tree delimbing apparatus that includes a housing through which felled trees are conveyed and delimbed, the housing having an open bottom so that the limb debris may be recuperated so that it can serve other useful purposes.

The present invention, therefore, relates to a tree delimbing apparatus which comprises: housing means having enclosing walls with openings therein defining: an inlet for receiving one or more trees to be delimbed, an outlet for discharging said trees delimbed and open base for evacuating limb debris; means for conveying the trees through the housing means; and rotatable delimbing means, mounted in the housing means, including a plurality of flexible delimbing flails extendible under centrifugal force to detach leaves and branches from the trees when conveyed through the housing means.

One important aspect of the present invention, when compared with the delimbing apparatus of the prior art, is the possibility of collecting or funneling the debris from the delimbing operation. In one preferred embodiment, the rotatable delimbing means consists of horizontally disposed rotating drums equipped with a series of flails that detach branches and leaves as the trees are conveyed through the housing. By disposing the drums horizontally a plurality of trees to be conveyed in side-by-side arranged and delimbed simultaneously.

The tree conveying means consists of rollers that control the advancing speed of the trees inside the housing and, consequently, control the beating action of the flails on the trees.

BRIEF DESCRIPTION OF THE DRAWINGS

FIG. 3 is a perspective view partially broken away of the tree delimbing apparatus of the present invention;

FIG. 4 is a side elevational view thereof;

FIG. 5 is a schematic layout of the various drive arrangements of the different rollers; and FIGS. 6 and 7 are top and side views respectively of the oscillating arrangement for the rear pressure roller of the apparatus.

DESCRIPTION OF PREFERRED EMBODIMENTS

Figure 1:
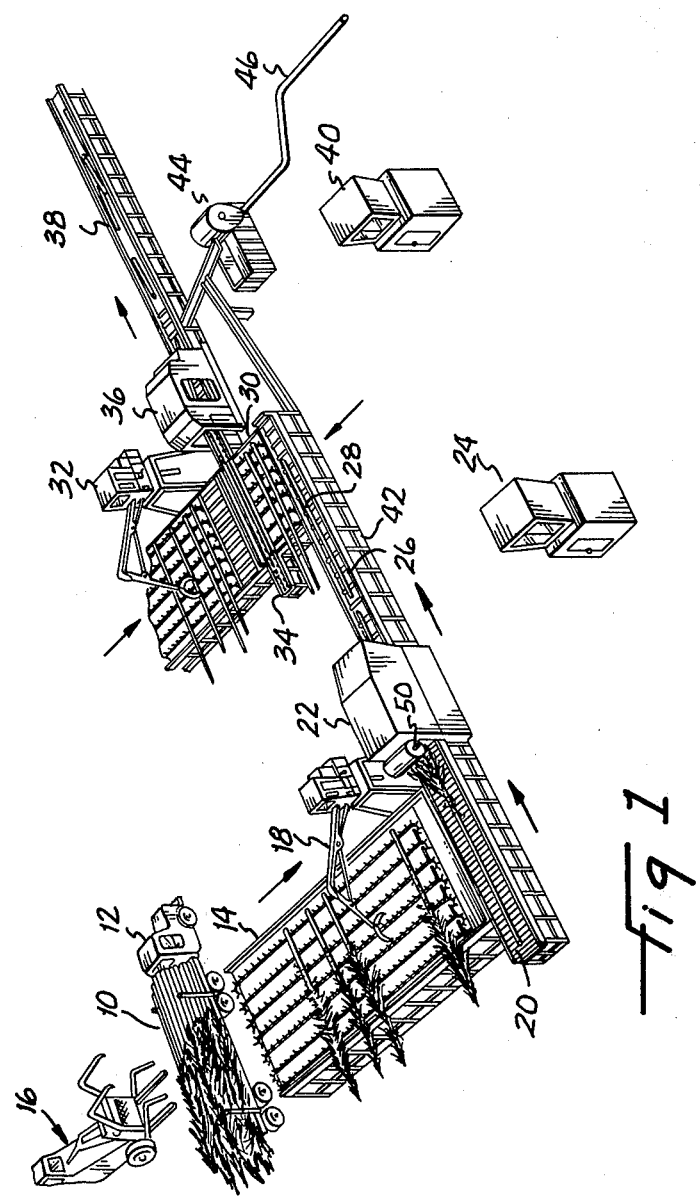
FIG. 1 is a layout showing a tree delimbing apparatus in accordance with the present invention working as a tandem unit in a tree processing station.

Referring to FIG. 1, there is shown a layout of various tree working stations which may comprise a tree cutting and processing installation at the cutting site or at the mill. Felled trees 10 are unloaded from a truck 12 and placed on an infeed deck 14 by means of a loader 16. A crane 18 picks up the tree lengths 10 and deposits them on a conveyor 20. The conveyor has a width sufficient to receive more than one tree lengths in side-by-side arrangement and substantially in a horizontal plane. Conveyor 20 advances the tree lengths through a tree delimbing apparatus 22 which may be operated under the supervision of an operator located in a control console 24. An outfeed discharge conveyor 26 carries the delimbed tree lengths 28 to a second deck 30 which places the tree lengths on a conveyor 34. A high-speed continuous pulp wood shear device 36 cuts the tree lengths into predetermined-size logs 38, again under the control of a console 40. One example of such shear device is described n Canadian Pat. No. 942,166 issued Feb. 19, 1974 to Forano Limitée. As described hereinafter in greater detail, the tree delimbing apparatus 22 has an open bottom for the discharge of limb debris. A conveyor 42 is provided beneath the machine 22 and conveyor 26 for carrying the debris to a hogging device 44 which reduces th branches and leaves to chips, which, in turn, are blown through duct 46 a word processing plant or to a hopper for transport. With arrangement shown in FIG. 1, one hundred percent recuperation of the cut tree lengths is possible.

Figure 2:
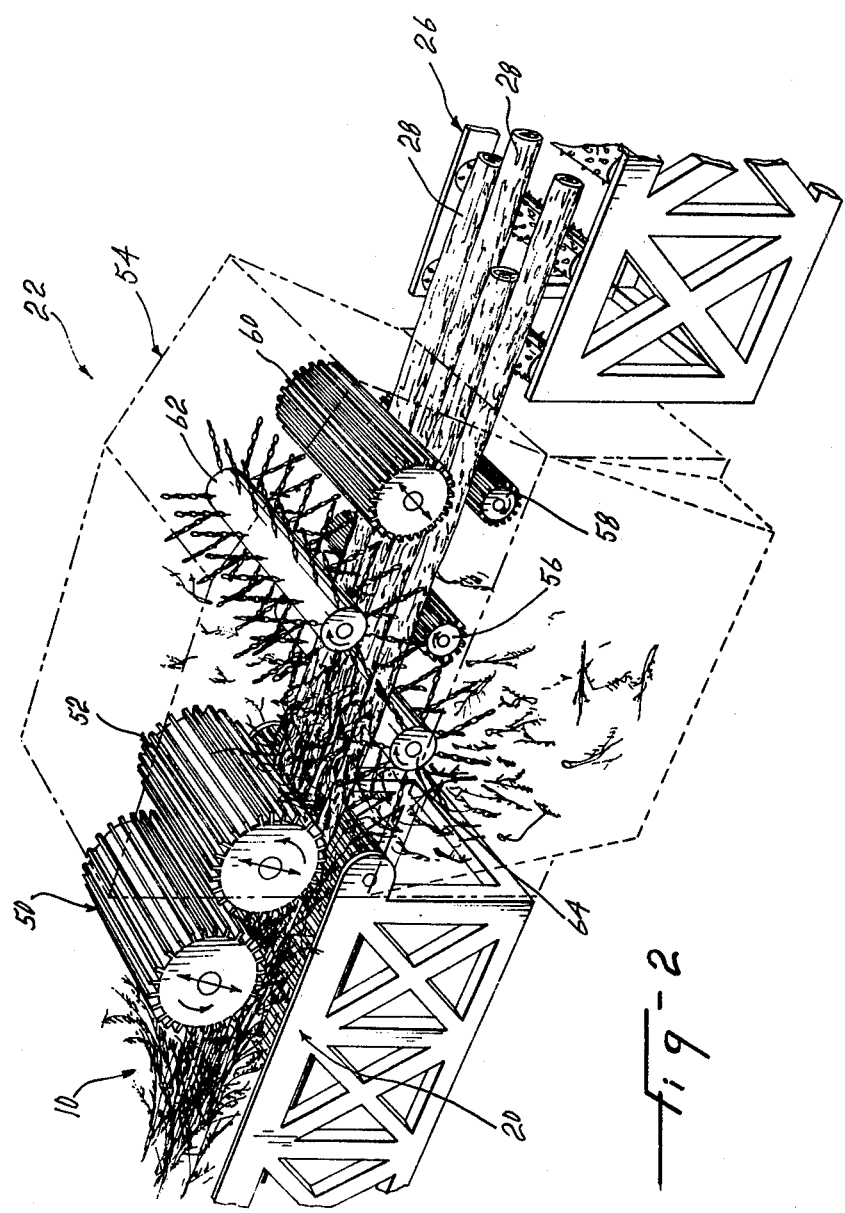
FIG. 2 is a perspective schematic view of the tree delimbing apparatus showing the disposition of the various rollers and flail carrying drums with respect to the housing shown in fanthom lines.

Referring to FIG. 2, a general description of the operation of the tree delimbing apparatus 22 of the present invention will be given. The tree lengths 10 on conveyor 20 first encounter a roller 50, located outside housing 54, which serves to press down on the branches of the tree lengths. A second roller 52 inside housing 54 presses the tree lengths against conveyor 20 for advancing the tree lengths inside the housing. The tree lengths then find support on support roller 56 and then on support roller 58. A rear pressure roller 60 cooperates with support roller 58 to move the tree lengths to the outfeed discharge conveyor 26. Inside housing 54, two rotatable drums 62 and 64 are mounted horizontally above and below of the tree feeding line. These drums include on their outer surface a plurality of flails 66 which are extendible under centrifugal force. The flails of the rotating drums detach branches and leaves from the passing tree lengths. Although two drums are shown, it is still possible to delimb a series of adjacently disposed passing tree lengths with only one flail-carrying drum. The drive mechanisms and arrangements for these rollers and drums have been omitted in FIG. 2 (as well as in FIG. 3) but will be described hereinafter with respect to FIG. 5.

Referring to FIG. 3, a more detailed construction of the tree delimbing apparatus 22 is shown. The housing 54 is enclosure defined by top and side walls 68 and 70; its lower frame 72 defines an open bottom while the front and rear walls include an inlet opening (not shown) and outlet opening 74.

The branch pressing roller 50 consists of a drum 76 of cylindrical shape and displaying a series of longitudinally-extending circumferentially-spaced blades 78. Roller 50 is located outside enclosure 54 and its driven shaft 80 is supported on a fork-like arrangement consisting of two side arms (one of which is shown as 82) pivotally mounted at 84 to the sidewalls 70 of housing 54; each arm 82 is formed of two portions 86 and 88 connected into an elbow-shaped manner. Pivotally connected at 90 on side arm portion 88, an auxiliary fork-like structure 92, consisting of two arm portions 94 and of a transverse bar 96, supports the front pressure roller 52. The latter consists of a drum 98 rotatably mounted on a driven shaft 100, which in turn is mounted to the side arms 94. A series of longitudinally-extending circumferentially-spaced serrated blades 102 are fixed to the outer surface of drum 98.

A jack 104, hydraulic or pneumatic, finds support on the housing structure and is connected to the first fork-like arrangement 82 while a similar jack 106 connects the second fork-like arrangement 92 to the cross bar 108 of the housing. Both these jacks may be remotely controlled from the console 24 shown in FIG. 1 for the operation of these respective fork arrangements; also, they serve as shock absorbers for the drums associated respectively therewith.

Shaft 110 shown protruding through the sidewalls 70 of the housing drives the chains supporting the slatt bar 112 in feed conveyor 20.

Tree support rollers 56 and 58 are, respectively, mounted on driven shafts 114 and 116 and each includes circumferentially-spaced and longitudinally extending blades 118 and 120, respectively. These blades also serrated for improved gripping action on the tree lengths.

The rear pressure roller 60 mounted adjacent the housing outlet port 74 is mounted on a pivotable fork arrangement 122 that consists of two arm portions 124 and 126 interconnected at their upper end by a transverse rod 128 which serves as the pivot axis for pressure roller 60. An hydraulic jack 130 which connects the fork arrangement to the housing side wall is operable from remote control console 24 to pivot the fork arrangement; the jack, pneumatic or hydraulic, also serves to absorb the shocks exerted by the pressure roller. The latter consists of a drum 132 of cylindrical shape and includes a series of circumferentially-spaced longitudinally-extending serrated blades 134.

A series of leg members 136 and 138 are pivotally mounted on each side of the housing and serve to fixedly support fork arrangements 82 and 122, respectively during servicing of the apparatus when not in use. Similarly, leg supports 140 pivotally mounted to each arm portion 88 serve to separate and distance fork arrangement 82 and the auxiliary fork arrangement 92 during servicing.

The construction of flail-carrying means, such as 62 and 64, is well known; they usually consists of a drum 146,148 pivotally mounted to a driven shaft 142,144; to the outer surface of the drums is attached a series of lengths of chain links. One particular construction of such flail-carrying drums is described in our copending application filed concurrently herewith. To ensure a satisfactory delimbing operation, it is preferred to use two drums 62,64 disposed above and beneath the passing tree lengths. To prevent an overlap of chains, the drum shafts are offset longitudinally to the machine with respect to one another. Chain overlap is not critical, but avoiding it reduces damages since they do not strike one another.

Referring to FIG. 4, a series of abutment plates is mounted to the opposite side walls 70 of the housing to limit the pivotal movement of fork arrangements 82,92 and 122: upper plate 150 and lower plate 152 limit the pivotal movement of fork 82; upper plate 154 and lower plate 156 limit the pivotal movement of fork 92; upper plate 158 and lower plate 160 limit the pivotal movement of the fork 122. Curved slots 162 and 164 are provided in the opposite side walls 70 to permit the pivotal movement of shafts 100 and 133, respectively, extending through the housing. Also shown in FIG. 4 is a mechanical levelling device, generally denoted 165, which serves to insure that the axis of the folding roller 50 is maintained in a horizontal plane. Such levelling device is provided on opposite sides of the housing and may consist of cable 165a fixedly anchored at opposite ends thereof to the sidewalls of the housing, the cable engaging a pulley 165b rotatably mounted on side arm 86.

FIG. 5 is a schematic representation of the drive mechanisms and connection for the various driven shafts of the apparatus of the present invention. A series of platforms 166, 167,168 are secured to housing 54 and platforms 169 and 170 are secured to lower frame 72 to respectively support a plurality of motors 172,173,174,175 and 176. Through a series of speed reduction sprockets and pulleys 178,179,180,181 and drive chains 182,183,184, motor 172 drives shaft 133 of the rear pressure roller 60. The flail-carrying drums 62 and 64 are respectively driven by means of motors 174 and 175 through a respective belt and pulley arrangements 186 and 188. Rotation of the branch-folding drum 50 is carried out by motor 173 through a series of chain 190,191,192 and sprockets 193,194,195,196. Motor 173 also drives front pressure roller 52 in synchronism with roller 50 through sprockets 197,198a,198b,194,193 and chains 199b, 199a,190. The rotation of the two support rollers 56 and 58 is carried out by motor 176 through the chain and sprocket arrangements 200 and 202.

In one preferred form of the invention, shaft 133 of pressure roller 60 may be made oscillating with respect to a horizontal axis extending through the roller so as to enable the roller to contact as much as possible adjacent tree lengths of different diameter. Referring to FIGS. 6 and 7 one of the side arms 124 of fork arrangement 122 is modified in construction. Arm portion 124a of side arm 124 includes a first portion 210 which is snuggly received within the somewhat larger portion 212. However, one end of portion 210 is pivotally mounted within portion 212 by a transverse pin 214 extending through members 210 and 212. Referring to FIG. 7, movement of portion 210 in portion 212 is absorbed by rubber pads 216 and 218 fixedly mounted at the extremity of arm portion 212. Hence, small variation of arm portion 210 relative to arm 212 on one side of the fork arrangement 122 will enable still an important variation in height inside the housing by the roller pressure 60. Therefore, in fork arrangement 122, although rod 128 (see FIG. 3) is fixed horizontally, shaft 133 can vary relative to the horizontal.

In another form of the invention, it is preferred to have shaft 133 of roller 60 slightly offset rearwardly with respect to shaft 116 of the roller support 133 to permit the downward pressure on the trunk being discharged at the outlet of the housing. With this arrangement, it is ensured that the cut tree lengths are not thrusted upwardly as they exit the housing.

Although the invention has been describeed with respect to specific forms, it will be evident that it may be refined and modified in various ways.

Insofar as the remote control of the operation of the delimbing apparatus is not part of the present invention, it will suffice to say that the speed of tree feeding in the housing can be varied so as to control the amount of beating submitted to the conveyed tree lengths. Hence, the various motor drives will be synchronized to optimize delimbing without damaging the trees. It is therefore wished to have it understood that the present invention should not be limited in interpretation except by the terms of the following claims.

The embodiments of the invention in which an exclusive property or privilege is claimed are defined as follows:

1. A tree delimbing apparatus comprising:
   housing means having enclosing walls with openings therein defining: an inlet for receiving a plurality trees to be delimbed, an outlet for discharging said trees delimbed and an opened base for evacuating limb debris;
   means for conveying horizontally and longitudinally in a side-by-side arrangement said trees through said housing means; and
   rotatable delimbing means, mounted in said housing means, including drum means mounted for rotation about an axis extending both horizontally and transversely to the direction of conveyance of said trees and a plurality of flexible delimbing flails attached to said drum means and extendible under centrifugal force to detach leaves and branches from said trees when conveyed through said housing means, said means for conveying including at least one substantially cylindrically shaped roller for conveying said trees past said delimbing means such that the leaves and branches of said trees are effectively removed therefrom.

2. A tree delimbing apparatus as defined in claim 1, wherein said conveying means include: infeed means adjacent said inlet for advancing trees to said inlet, roller support means mounted inside said housing means below the feed line of said trees through said housing means for supporting and advancing said trees in said housing means, and pressure roller means mounted in said housing means and above said feed line of said trees through said housing and cooperating with said roller support means for advancing said trees through said housing means.

3. A tree delimbing apparatus as defined in claim 2, wherein said roller support means and said pressure roller means inside said housing means consist of drum means having a cylindrical outer surface and of a series of circumferentially spaced blades extending lengthwise of said surface.

4. A tree delimbing apparatus as defined in claim 3, wherein said blades are serrated.

5. A tree delimbing apparatus as defined in claim 2, wherein said pressure roller means include a first drum located adjacent said inlet and a second drum located adjacent said outlet.

6. A tree delimbing apparatus as defined in claim 5, wherein said second drum located adjacent said outlet is mounted on a shaft having its opposite ends supported on a fork arrangement pivotably mounted to said housing means.

7. A tree delimbing apparatus as defined in claim 6, comprising jack means connecting said fork arrangement to said housing means for drive and shock absorbing action of said fork arrangement.

8. A tree delimbing apparatus as defined in claim 6, wherein said support roller means include a drum mounted on a shaft supported on said housing means and extending adjacent said outlet; said shaft of said second drum being offset rearwardly with respect to a vertical plane passing through said shaft of said drum of said support roller means whereby a downward force may be exerted on said trees as said trees advance toward said outlet.

9. A tree delimbing apparatus as defined in claim 6, wherein said fork arrangement consists of a U-shaped structure having side arm portions extending along opposite sidewalls of said housing means; pivot means in one of said side arm portions allowing one end of said shaft of said drum to pivot with respect to the opposite end of said shaft for adjustment to various size of adjacently disposed conveyed trees.

10. A tree delimbing apparatus comprising:
   housing means having enclosing walls with openings therein defining an inlet for receiving a plurality trees to be delimbed, an outlet for discharging said trees delimbed and an opened base for evacuating limb debris;
   means for conveying horizontally and longitudinally in a side-by-side arrangement said trees through said housing means said means for conveying including infeed means adjacent said inlet for advancing trees to said inlet, roller support means mounted inside said housing means below the feed line of said trees through said housing means for supporting and advancing said trees in said housing means, and pressure roller means mounted in said housing means and above said feed line of said trees through said housing and cooperating with said roller support means for advancing said trees through said housing means;
   rotatable delimbing means, mounted in said housing means, including drum means mounted for rotation about an axis extending both horizontally and transversely to the direction of conveyance of said trees and a plurality of flexible delimbing flails attached to said drum means and extendible under centrifugal force to detach leaves and branches from said trees when conveyed through said housing means; and a rotatable branch folding means located outside said housing means and extending over said infeed means for folding said branches prior to entry of said trees in said housing means.

11. A tree delimbing apparatus as defined in claim 10, wherein said branch folding means consist of drum means having a cylindrical outer surface and of a plurality of circumferentially spaced blades extending lengthwise of said surface.

12. A tree delimbing apparatus comprising:

housing means having enclosing walls with openings therein defining an inlet for receiving a plurality trees to be delimbed, an outlet for discharging said trees delimbed and an opened base for evacuating limb debris;

means for conveying horizontally and longitudinally in a side-by-side arrangement said trees through said housing means, said means for conveying including infeed means adjacent said inlet for advancing trees to said inlet, roller support means mounted inside said housing means below the feed line of said trees through said housing means for supporting and advancing said trees in said housing means, and pressure roller means including a first drum mounted in said housing means adjacent said inlet and a second drum adjacent said outlet, said drums being mounted above said feed line of said trees through said housing and cooperating with said roller support means for advancing said trees through said housing means;

rotatable delimbing means, mounted in said housing means, including drum means mounted for rotation about an axis extending both horizontally and transversely to the direction of conveyance of said trees and a plurality of flexible delimbing flails attached to said drum means and extendible under centrifugal force to detach leaves and branches from said trees when conveyed through said housing means; and a branch folding roller located outside said housing means and extending over said infeed means; and a first work arrangement supporting said branch folding roller and pivotably mounted to said housing means.

13. A tree delimbing apparatus as defined in claim 12, comprising a second fork arrangement supporting said first drum adjacent said inlet; said second fork arrangement being pivotably mounted to said first fork arrangement outside said housing means.

14. A tree delimbing apparatus as defined in claim 13, wherein said second pivotable fork arrangement extends above said first fork arrangement; abutment means on said first and second fork arrangements cooperating so as to cause pivotal movement of said second fork arrangement by said first fork arrangement when said first fork arrangement is raised a predetermined height.

15. A tree delimbing apparatus as defined in claim 14, further comprising first jack means connecting said first fork arrangement to said housing means and second jack means connecting said second fork arrangement to said housing means for drive and shock absorbing action of said fork arrangements.

16. A tree delimbing apparatus as defined in claim 12, further comprising a mechanical levelling device for maintaining said folding roller substantially in a horizontal plane.

* * * * *

REEXAMINATION CERTIFICATE (1488th)

United States Patent [19]

Brisson

[11] B1 4,214,616

[45] Certificate Issued Jun. 11, 1991

[54] TREE DELIMBING APPARATUS

[75] Inventor: Maurice J. Brisson, Laval, Canada

[73] Assignee: Weyerhaeuser Company, Tocoma, Wash.

Reexamination Request:
No. 90/002,193, Nov. 5, 1990

Reexamination Certificate for:
Patent No.: 4,214,616
Issued: Jul. 29, 1980
Appl. No.: 904,807
Filed: May 11, 1978

[30] Foreign Application Priority Data

Feb. 16, 1978 [CA] Canada .................................. 297048

[51] Int. Cl.⁵ .................................................. B27L 1/00
[52] U.S. Cl. ................................ 144/2 Z; 144/208 J; 144/343; 241/194
[58] Field of Search ................ 144/2 Z, 3 D, 208 R, 144/208 J, 250 R, 338, 341, 343; 241/189 R, 193, 194

[56] References Cited

U.S. PATENT DOCUMENTS 1,241,925 10/1917 Coleman ..................... 144/250 R
1,670,723 5/1928 Hummel .
1,762,595 6/1930 Smith ............................. 144/208 J
2,792,860 5/1957 Watkins .
2,994,352 8/1961 Johnson .
3,464,468 9/1969 Thompson et al. .......... 144/34 R X

FOREIGN PATENT DOCUMENTS 144423 3/1954 Sweden ............................ 144/208 J

OTHER PUBLICATIONS

Documents Relating to the Copeland Model 410 Piranha Delimber, Including Photograph, Proposed Patent Application Drawings (6 FIGS) Specification Sheet, Copeland/O'Brien & Jacobson Correspondence dated Jul. 7, 1975 and Sep. 3, 1975, Copeland/Neal Correspondence of Nov. 14, 1975.

Primary Examiner—W. Donald Bray

[57] ABSTRACT

A tree delimbing apparatus comprises a housing through which trees are conveyed and delimbed; the housing has an open bottom through which branches and leaves are discharged. A series of rollers are mounted inside the housing for conveying and delimbing the trees; the delimbing rollers are drums to which are attached a plurality of flexible flails extendible under centrifugal force, the flails detaching leaves and branches from the trees as they are conveyed through the housing. The particular construction of the housing enables the recuperation of all limb debris for other uses such as energy source, prevents pollution from spreading of such debris, and insures safety of all personnel in the vicinity of the machine.

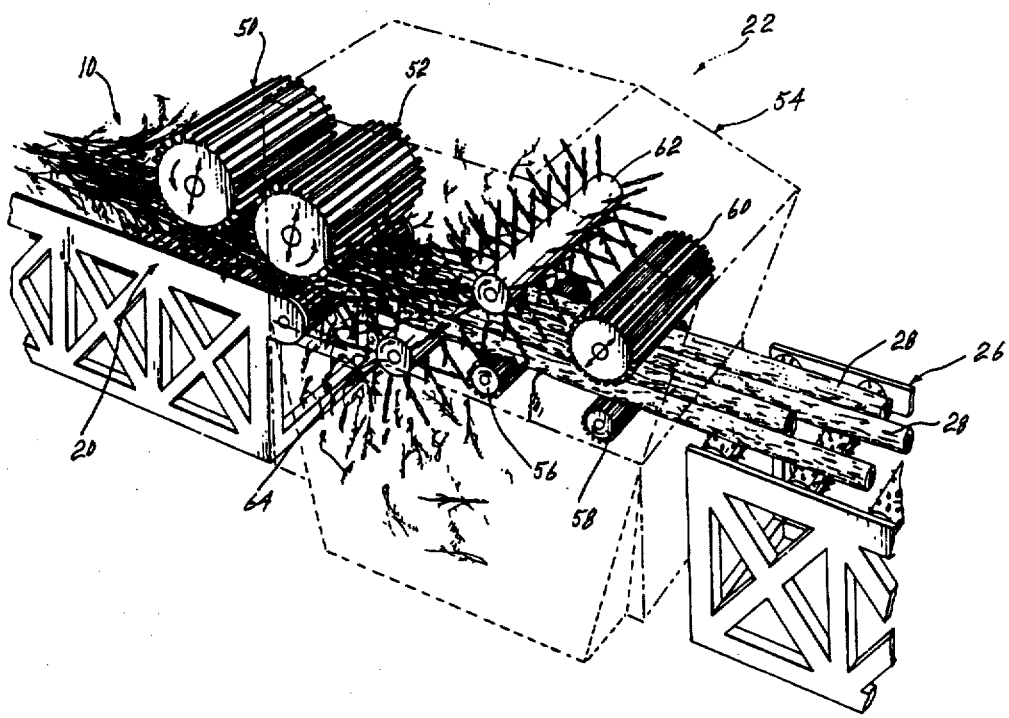

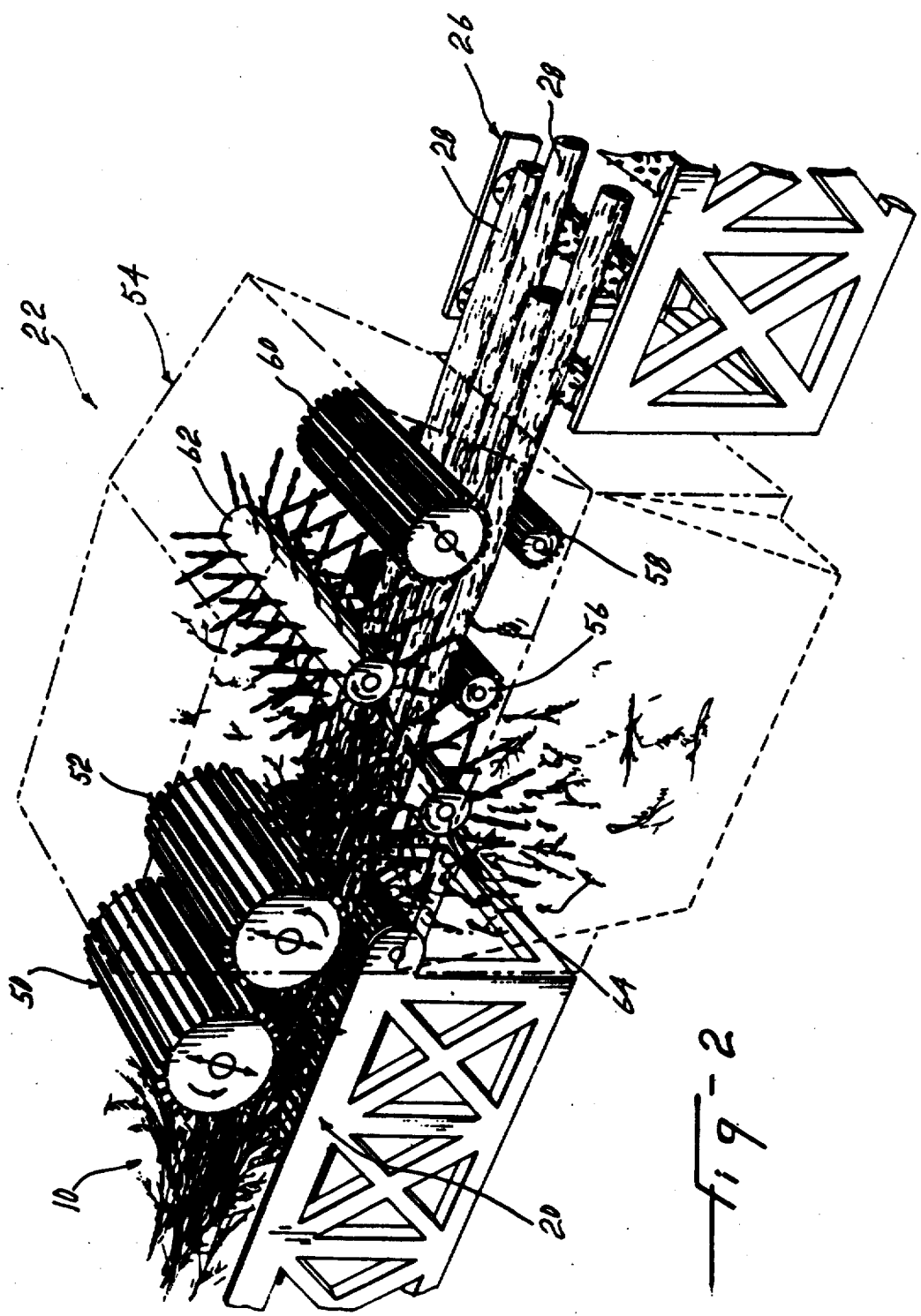

B1 4,214,616

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 10 and 12 are determined to be patentable as amended.

Claims 2–9, 11 and 13–16, dependent on an amended claim, are determined to be patentable.

1. A tree delimbing apparatus comprising:
housing means having enclosing walls with openings therein defining: an inlet for receiving a plurality *of* trees to be delimbed, an outlet for discharging said trees delimbed and an opened base for evacuating limb debris;
means for conveying horizontally and longitudinally in a side-by-side arrangement said trees through said housing means; and
rotatable delimbing means, mounted in said housing means, including *plural* drum means *each* mounted for rotation about an axis extending both horizontally and transversely to the direction of conveyance of said trees *and adjacently disposed above and below the trees being conveyed through said housing,* and a plurality of flexible delimbing flails attached to *each* said drum means and extendible under centrifugal force to detach leaves and branches from said trees when conveyed through said housing means, said means for conveying including at least one *power driven* substantially cylindrically shaped roller for conveying said trees past said delimbing means such that the leaves and branches of said trees are effectively removed therefrom.

10. A tree delimbing apparatus comprising:
housing means having enclosing walls with openings therein defining an inlet for receiving a plurality *of* trees to be delimbed, an outlet for discharging said tree delimbed and an opened base for evacuating limb debris;
means for conveying horizontally and longitudinally in a side-by-side arrangement said trees through said housing means said means for conveying including *power driven* infeed means adjacent said inlet for advancing trees to said inlet, roller support means mounted inside said housing means below the feed line of said trees through said housing means for supporting and advancing said trees in said housing means, and *power driven* pressure roller means mounted in said housing means and above said feed line of said trees through said housing and cooperating with said roller support means for advancing said trees through said housing means;
rotatable delimbing means, mounted in said housing means, including *plural* drum means *each* mounted for rotation about an axis extending both horizontally and transversely to the direction of conveyance of said trees *and adjacently disposed above and below the trees being conveyed through said housing,* and a plurality of flexible delimbing flails attached to *each* said drum means and extendible under centrifugal force to detach leaves and branches from said trees when conveyed through said housing means, and
a rotatable branch folding means located outside said housing means and extending over said infeed means for folding said branches prior to entry of said trees in said housing means.

12. A tree delimbing apparatus comprising:
housing means having enclosing walls with openings therein defining an inlet for receiving a plurality *of* trees to be delimbed, an outlet for discharging said trees delimbed and an opened base for evacuating limb debris;
means for conveying horizontally and longitudinally in a side-by-side arrangement said trees through said housing means, said means for conveying including *power driven* infeed means adjacent said inlet for advancing trees to said inlet, roller support means mounted inside said housing means below the feed line of said trees through said housing means for supporting and advancing said trees in said housing means, and *power driven* pressure roller means including a first drum mounted in said housing means adjacent said inlet and a second drum adjacent said outlet, said drums being mounted above said feed line of said trees through said housing and cooperating with said roller support means for advancing said trees through said housing means;
rotatable delimbing means, mounted in said housing means, including *plural* drum means *each* mounted for rotation about an axis extending both horizontally and transversely to the direction of conveyance of said trees *and adjacently disposed above and below the trees being conveyed through said housing,* and a plurality of flexible delimbing flails attached to *each* said drum means and extendible under centrifugal force to detach leaves and branches from said trees when conveyed through said housing means; and
a branch folding roller located outside said housing means and extending over said infeed means; and a first work arrangement supporting said branch folding roller and pivotably mounted to said housing means.

* * * * *